Figure 1:
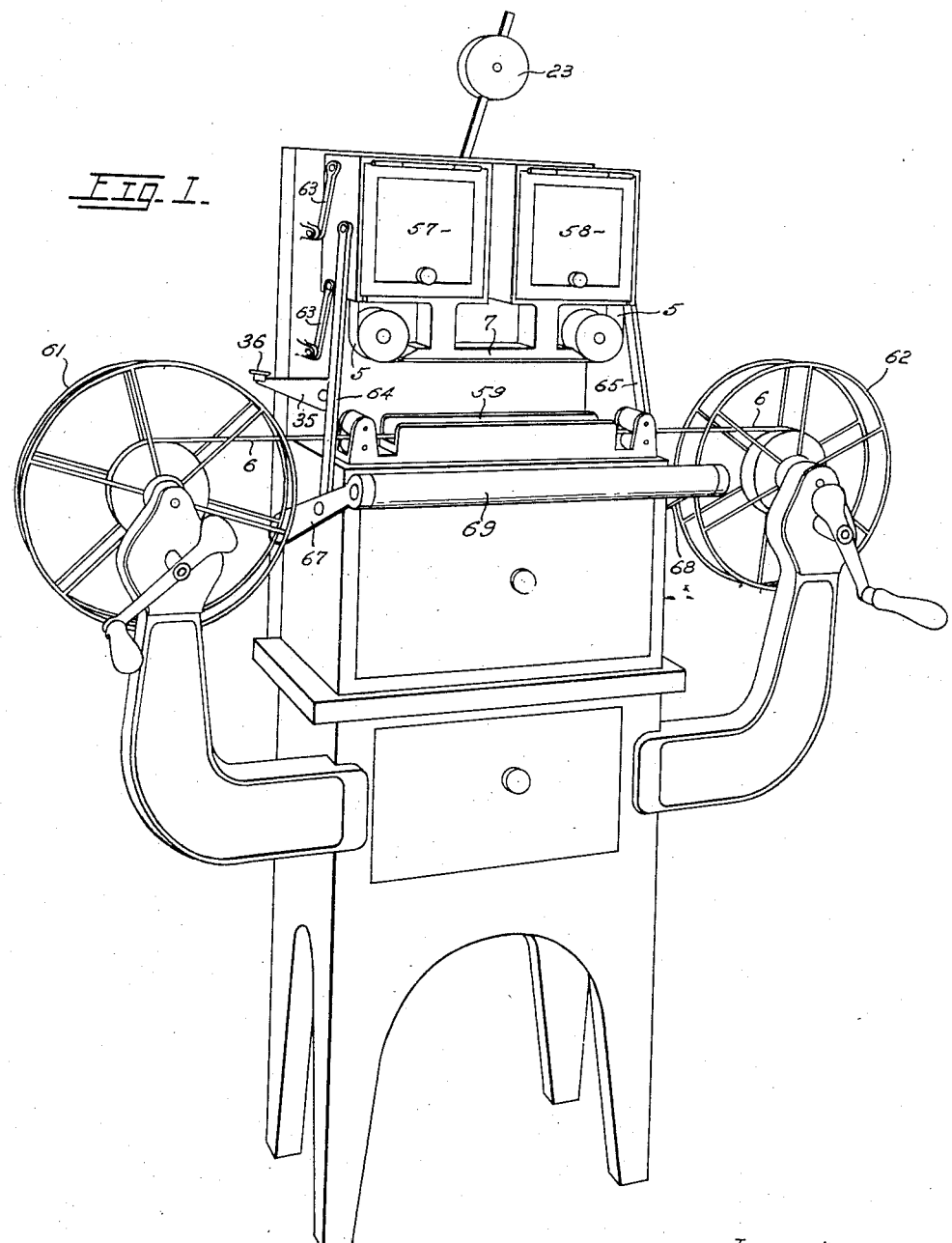

Jan. 3, 1939.  A. E. REEVES  2,142,413
PHOTOGRAPHIC EXPOSURE TESTER
Filed May 1, 1937  2 Sheets-Sheet 2
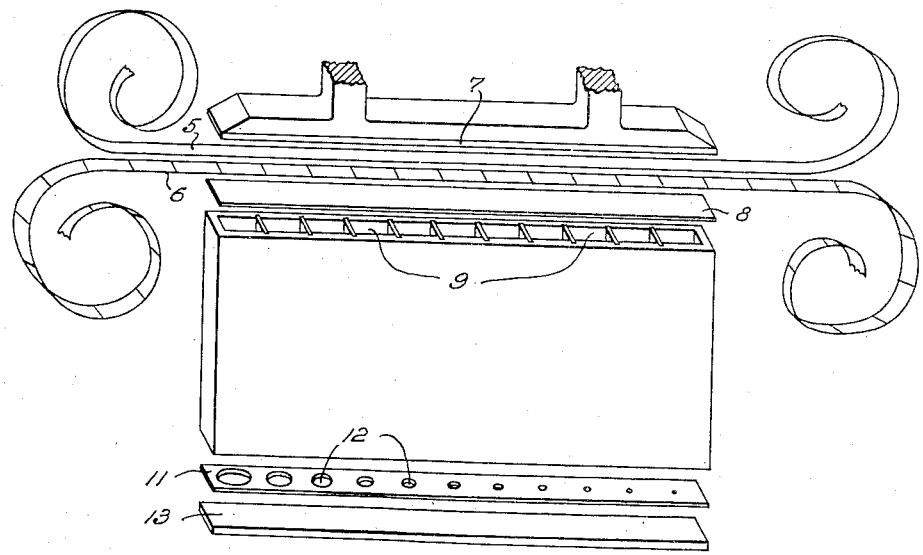
FIG. 2.
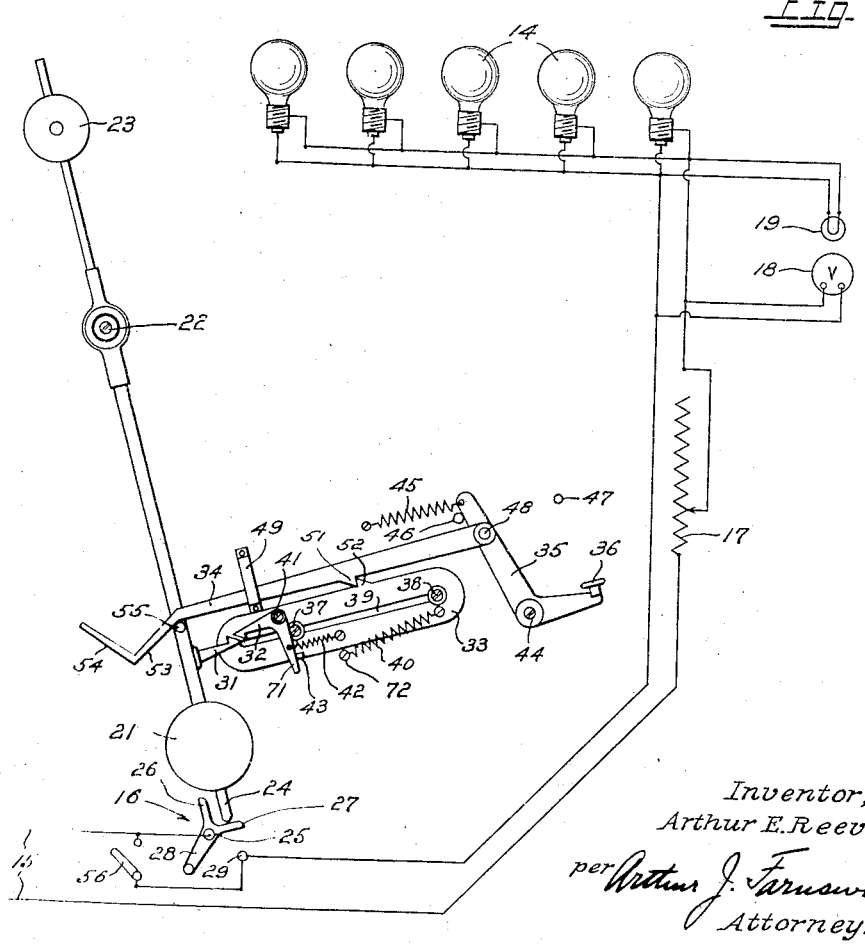
Inventor;
Arthur E. Reeves,
per Arthur J. Farnsworth
Attorney.

Patented Jan. 3, 1939

2,142,413

UNITED STATES PATENT OFFICE 2,142,413

PHOTOGRAPHIC EXPOSURE TESTER

Arthur E. Reeves, Los Angeles, Calif.

Application May 1, 1937, Serial No. 140,175

3 Claims. (Cl. 200—33)

My invention relates to means for accurately determining correct exposure times for photographic printing, and it will be found to be especially useful for timing the printing of motion picture films. Among the salient objects of the invention are: first, to provide an improved mechanical device for the just stated purpose; second, to make it feasible to eliminate a large portion of the waste time, and loss of film, which at present result from improper timing of photographic printing; and, third, to accomplish these and related objects by means of a simple, dependable, and relatively inexpensive device.

My objects are attained in the manner illustrated in the accompanying drawings, in which—

Figure 1 is a perspective view of an embodiment of my invention which is adapted for testing the printing qualities of motion picture negatives, in photographic dark rooms; and Figure 2 is a diagram illustrating the co-operative relations between the various parts of this device.

Similar reference numerals refer to similar parts throughout both figures.

Use of my invention makes it easy to determine in advance what is the correct exposure time for printing a photographic film. Briefly the procedure is: first, to synchronously expose a positive film through a series of contiguous areas of the negative, for identical accurately determined periods, to various quantums of light flux; second, to compare the printed areas of the positive after development, to ascertain the most desirable exposure; and, third, to prescribe the correct exposure time on a printer of which relative values of the corresponding characteristics are known.

An understanding of the invention can be had most readily, perhaps, by referring first more particularly to the diagram of Fig. 2. An unexposed positive film, of the same emulsion as that which is to be used for final printing, is shown at 5. This is superposed upon the negative film 6 being tested, under a pressure pad 7, and above a printing glass 8. Below glass 8 is a series of contiguous exposure tubes 9. These are of rectangular cross-section, and the cross-sectional dimensions and spacing are such that the series of tubes is adapted to expose practically the entire area of a corresponding series of the negative picture frames. Immediately below the exposure tubes is a plate 11, having a series of similarly spaced apertures 12 therethrough. These apertures are of accurately graded and related sizes, positioned so as to be co-axial with the respective exposure tubes. Beneath plate 11 is a diffusion glass 13; and beneath that, in turn, is a series of frosted lamps 14, constituting the exposure light source.

Lamps 14 are adapted for connection to an electric circuit 15, through an automatic timing switch indicated by arrow 16. An adjustable resistance 17 is connected in series with the lamps, and a voltmeter 18 is provided, so that the voltage at the lamps may be properly adjusted and maintained while the film test is being made. A small red light 19 serves to illumine the voltmeter sufficiently for this purpose, and performs the additional function of indicating when circuit 15 is closed.

For timing the test exposures, I prefer to use a pendulum 21, of the metronome type, which swings on a ball bearing about an intermediate pivot 22, and which is provided with an adjustably positioned counterweight 23. This constitutes one of the most accurate known methods of timing. The lower end of the pendulum carries a finger 24, which is adapted to operate switch 16.

The typical form of timing switch illustrated comprises a Y-lever which is pivoted at 25, and which is provided with upwardly directed arms 26 and 27. These arms diverge from each other at ninety degrees, and are adapted for engagement by finger 24, for moving contact arm 28 to open and close circuit 15. At the start of the downward timing swing of the pendulum, switch 16 is in the position shown in Fig. 2, and circuit 15 is open. A slight further downward swing of the pendulum will cause finger 24 to engage arm 26, and thus move arm 28 to closed circuit position in contact with the face of button 29. Upon its return, as the pendulum nears the end of its swing, finger 24 will engage arm 27 and cause the switch to again assume the position shown in Fig. 2, where the circuit is open.

It is well known, of course, that no pendulum can return to its exact starting position, particularly when it has to do some external work like moving a timing switch, unless it receives an energy impulse in addition to being acted upon by gravity. To provide such an impulse, I lift the pendulum somewhat above the point where it is capable of operating switch 16, before allowing it to start its downward timing swing. This insures that, upon its return, the pendulum will retain sufficient energy to again operate the timing switch.

A typical form of pendulum release mechanism, for accomplishing the just-stated purpose, is shown diagrammatically in Fig. 2. This comprises a catch 31 upon the lower end of the pendulum arm; a pivoted bell crank pawl 32 adapted to engage catch 31, and which is mounted upon a slotted plate 33, the latter being adapted to move in a direction approximately perpendicular to the pendulum arm at the top of its swing; and a latch bar 34, adapted to engage plate 33 and cause it to slide in a direction away from the pendulum arm. A bell-crank operating lever 35, carrying a finger push button 36, controls the entire pendulum elevating and release mechanism, with the aid of certain restoring springs and stop buttons.

Slotted plate 33 is always aligned by means of the two screws 37 and 38, which extend through a longitudinal slot 39 in the plate. Tension spring 40 tends to hold this plate in its normal lowermost position, as shown. Pawl 32 is pivoted at 41 upon the plate, and tension spring 42 tends to hold it in the position shown, against stop lug 43. Bell-crank 35 is pivoted at 44, and tension spring 45 tends to hold it against stop button 46. Another stop 47 limits the motion of the bell-crank in the other direction.

Latch bar 34 is pivotally mounted upon lever 35 at 48, and is adapted to be moved longitudinally back and forth by means of this lever. It can also swing upwardly, to a limited extent determined by the positioning yoke 49. This latch bar carries a saw-tooth projection 51, adapted to engage a similar projection 52 on the upper edge of slotted plate 33; and its left hand extremity is shaped to afford cam surfaces 53 and 54. The latter surfaces are adapted for engagement by a stud 55 on the pendulum arm, whereby the latch bar can be disengaged from slotted plate 33. Since the latch bar is pivoted at its right hand extremity, gravity will tend to keep it in its lowermost position at all times.

A switch 56 is provided, to afford means for making preliminary adjustments before putting the device into service.

Fig. 1 illustrates, as previously stated, a preferred form of my invention adapted for use in photographic dark rooms. It is equipped with two film magazines 57 and 58, to hold unexposed and exposed positive film respectively. Although the machine is used in the dark room, a prolonged exposure of the positive film to the red light would result in a slight fogging thereof. This is prevented by the use of the magazines.

The device also is equipped with a film positioning channel 59, just above, and in alignment with, printing glass 8; and with reels 61 and 62 for holding the negative film to be tested.

Magazines 57 and 58, and pressure pad 7, constitute a unitary structure; and this is constrained by a pair of pivoted links 63, at each side, in such manner that the structure can be given a parallel outward and downward motion. The structure is further supported by pivoted links 64 and 65, from the side bars 67 and 68 of an operating bail, of which the handle bar is shown at 69. This handle bar normally is held at its upper position, as shown in Fig. 1, by springs or counter weights which, to avoid complicating the drawings, have not been shown. Such features can be supplied by any competent mechanic; as, for instance, by connecting the rear pivoted ends of side bars 67 and 68 by a rotatable cross shaft having an intermediate laterally extending lever attached thereto; and hanging a counter weight upon, or attaching a spring to, said lever.

The operation of the device is very simple. First the switch 56 is closed, and the voltage at lamps 14 is adjusted to standard value by means of resistance 17 and voltmeter 18. Switch 56 is then opened, handle bar 69 is pulled down to put the positive and negative films in contact in channel 59, and operating button 36 is depressed. The last said action causes bell crank lever 35 to pull latch bar 34 to the right (Fig. 2); and, with it, slotted plate 33 and the pendulum, since catch 31 and pawl 32 will be in engagement at that time. The pendulum is given its initial lift and energy increment in this manner. As soon as tripping arm 71 of the pawl comes into operative engagement with stud 72, the pendulum will be released and start on its downward swing. Its finger 24 will almost immediately thereafter throw timing switch 16 to its closed position, causing lights 14 to be illuminated, and the test exposure of film 5 to begin. Upon its return, the pendulum will open timing switch 16, terminate the exposure, and become re-latched by reason of the re-engagement of catch 31 and pawl 32. This re-engagement is assured, since pendulum stud 55 will contact cam surface 53 at the early part of the downward swing of the pendulum; thus raising latch bar 34 and disengaging the teeth 51 and 52. The various restoring springs and gravity, will return the respective parts to their normal positions shown in Fig. 2.

After the positive test film 5 has been exposed in the manner described, it is developed for a standard time, in the standard manner and solutions. Comparison of the several simultaneously made individual exposures will then determine the most desirable exposure of the lot; and the manner of duplicating such exposure on a printer of which the relative values of corresponding characteristics are known, i. e. to which my device has been matched, can then be prescribed by any person who is familiar with this art.

It will be noted that, provided the printer to be used is properly matched to my device in the manner indicated, its exposures being known to be equivalent to exposure through a certain one tube and aperture of my device when operated under standard conditions, the colors and temperatures of the respective light sources become of no importance. It only is necessary to operate both devices under the exact conditions obtaining when the matching was accomplished. Obviously, aperture plates 11 may be made for a number of different printers, and these will remain correct for timing purposes, provided that the conditions which existed at the respective matchings are not varied.

It is perfectly feasible, by the use of well known expedients which are familiar to competent mechanics, to arrange the device so that the lifting of handle bar 69 to its original position will cause the just exposed portion of film 5 to wind up automatically on a reel in magazine 58; and to bring down a fresh portion of unexposed film from magazine 57 into proper position for making the succeeding test.

It also is feasible to construct the device in ways that will be apparent to workers in this field, so that the edge number of negative film 6 may be printed on each test. If this is done, it will obviate all questions as to what particular portion of a negative the test relates.

Having thus fully disclosed my invention, I claim:

1. Actuating means for a switch comprising a pendulum mounted in position for one end to engage the movable contact of the switch during its swinging movement in opposite directions and alternately close and open the switch during such swinging movements, a catch extending laterally from one side of said pendulum, a plate slidable laterally of the pendulum, a latch carried by said plate for engaging said catch and holding the pendulum at one extremity of its swinging movement with the switch open, and means for releasably holding said plate in a set position.

2. Actuating means for a switch comprising a pendulum mounted in position for one end to engage the movable contact of the switch during its swinging movement and alternately close and open the switch during swinging movement of the pendulum in opposite directions, a catch extending laterally from one side of said pendulum, a plate spaced from the said side of the pendulum and slidable transversely of said pendulum, a spring for urging said plate towards the pendulum, means to limit movement of the plate towards the pendulum, a latch carried by said plate and yieldably held in position to engage said catch and secure the pendulum at one extremity of its swinging movement with the switch open, and means for releasably securing the plate in a position shifted away from the pendulum.

3. Actuating means for a switch comprising a pendulum mounted in position to engage the switch during its swinging movement and alternately close and open the switch during swinging movement in opposite directions, a catch extending laterally from one side of said pendulum, a plate slidable transversely of said pendulum, a spring for urging said plate towards the pendulum, means to limit movement of the plate towards the pendulum, a latch carried by said plate and yieldably held in position to engage said catch and secure the pendulum at one extremity of its swinging movement with the switch open, a tooth carried by said plate, an operating lever, means to release the pendulum when the plate is moved away by the operating lever, a latch bar pivoted to said lever and extending longitudinally of the plate over the same, a tooth carried by said bar for engaging the tooth of the plate and securing the plate in a position shifted away from said pendulum, the free end portion of said bar being V-shaped to provide oppositely sloping cam surfaces, and a stud extending from said pendulum under the bar for engaging the cam surfaces and shifting the bar vertically about its pivot into and out of position for engagement of its tooth with the tooth of the plate.

ARTHUR E. REEVES.